United States Patent
Fortuna et al.

(10) Patent No.: US 9,741,083 B2
(45) Date of Patent: Aug. 22, 2017

(54) SYSTEMS AND METHODS FOR FACILITATING CLOSING OF A CHECK

(71) Applicant: NCR Corporation, Duluth, GA (US)

(72) Inventors: James Lee Fortuna, Dallas, TX (US); James A. Cloin, Arlington, TX (US)

(73) Assignee: NCR Corporation, Duluth, GA (US)

(*) Notice: Subject to any disclaimer, the term of this patent is extended or adjusted under 35 U.S.C. 154(b) by 239 days.

(21) Appl. No.: 14/206,708

(22) Filed: Mar. 12, 2014

(65) Prior Publication Data

US 2014/0324606 A1 Oct. 30, 2014

Related U.S. Application Data

(60) Provisional application No. 61/817,687, filed on Apr. 30, 2013.

(51) Int. Cl.
*G06Q 30/00* (2012.01)
*G06Q 50/12* (2012.01)
*G06Q 20/32* (2012.01)
*G06Q 30/04* (2012.01)

(52) U.S. Cl.
CPC .......... *G06Q 50/12* (2013.01); *G06Q 20/322* (2013.01); *G06Q 20/3276* (2013.01); *G06Q 20/3278* (2013.01); *G06Q 30/04* (2013.01)

(58) Field of Classification Search
CPC ..................................................... G06Q 50/12
USPC ........................................................ 705/15
See application file for complete search history.

(56) References Cited

U.S. PATENT DOCUMENTS

| | | | |
|---|---|---|---|
| 7,385,479 B1* | 6/2008 | Green | G06Q 10/00 705/15 |
| 2008/0288357 A1 | 11/2008 | Stambaugh et al. | |
| 2012/0136754 A1* | 5/2012 | Underwood | G06Q 30/06 705/26.43 |
| 2012/0206237 A1 | 8/2012 | Lovegreen | |
| 2012/0296726 A1 | 11/2012 | Dessert et al. | |
| 2014/0099981 A1* | 4/2014 | Horbal | H04B 5/0031 455/466 |
| 2014/0100931 A1* | 4/2014 | Sanchez | G06Q 20/40 705/14.23 |
| 2014/0156319 A1* | 6/2014 | Deeb | G06Q 30/06 705/5 |

* cited by examiner

*Primary Examiner* — Hunter Wilder
(74) *Attorney, Agent, or Firm* — Kevin P. Belote; Schwegman, Lundberg & Woessner

(57) ABSTRACT

Various methods are described for facilitating closing and payment of a check. One example method may comprise performing an action with a mobile device proximate a physical location associated with the check. The method may further comprise receiving in response a location identifier associated with the physical location. Additionally, the method may comprise determining the check to be closed based at least in part on the location identifier. Another example method may comprise performing an action with a mobile device proximate a folio device. The method may further comprise receiving in response a folio device identifier associated with the folio device. Additionally, the method may comprise providing for transmission of the check information to the folio device based at least in part on the folio device identifier. Similar and related methods, apparatuses, and computer program products are also provided.

12 Claims, 4 Drawing Sheets

SYSTEMS AND METHODS FOR FACILITATING CLOSING OF A CHECK

CROSS-REFERENCE TO RELATED APPLICATIONS

This application claims priority to U.S. provisional application No. 61/817,687, filed Apr. 30, 2013, which is incorporated herein by reference.

BACKGROUND OF THE INVENTION

The service industry continues to grow as technology advances and as service providers and staff become more technologically savvy. Similarly, as customers of the service industry become more accustomed to technology, expectations increase for more efficient and easy service. In the restaurant service industry, in particular, there have been moderate technological advances. There are still many areas, however, that have not changed significantly over time. One area of the restaurant service industry that continues to frustrate and inconvenience customers and staff alike is closing out and paying the check.

Generally, when a customer has finished dining or having drinks, the customer must get the attention of the waiter. The waiter must then go to a work station to close out and print the customer's check. Once the check is brought back, the customer must then select a form of payment and again wait on the waiter to collect the check and payment. The waiter will then need to return to the work station and complete the sale transaction. In most cases, the waiter must then return to the customer to provide change, a receipt, and/or to return a credit or debit card. Often, when payments are made by credit card, the customer subsequently adds a gratuity on the printed receipt. Some customers do not like for the waiter to see the gratuity amount before the customer has left the restaurant, but often the waiter will return and collect the receipt before the customer has left.

The entire check closing and payment process can take a very long time. An otherwise pleasant dining and service experience may be tarnished due to delaying the customer's ability to pay and leave when they are ready. The delay may often be out of the waiter's control, for example if there are other waiters lining up to use the work station. Additionally, the waiter must make several trips back and forth to the customer to complete the transaction, all the while the customer is waiting.

Accordingly, it may be desirable to provide systems, methods, apparatuses, and computer program products for facilitating closing and payment of a check that avoid the above, and other, drawbacks associated with the current art.

BRIEF SUMMARY OF THE INVENTION

Various embodiments of the present invention provide systems, methods, apparatuses, and computer program products for facilitating closing and payment of a check. An example method for identifying a check to be closed with a mobile device may comprise performing an action with the mobile device proximate a physical location associated with the check; receiving in response a location identifier associated with the physical location; and determining the check to be closed based at least in part on the location identifier.

In an example embodiment, the action may comprise tapping a tag associated with the physical location.

In another example embodiment, the action may comprise scanning a tag associated with the physical location.

In yet another example embodiment, tapping the tag may result in initiating a short range communication with the tag at an instance in which the mobile device is sufficiently proximate the tag to communicate.

In another example embodiment, the method may further comprise transferring check information associated with the check to a folio device.

In an example embodiment, transferring the check information may further comprise performing a second action with the mobile device proximate the folio device; receiving in response a folio device identifier associated with the folio device; and providing for transmission of the check information to the folio device based at least in part on the folio device identifier.

In another example embodiment, the second action may comprise tapping a tag associated with the folio device.

In yet another example embodiment, the second action may comprise scanning a tag associated with the folio device.

In another example embodiment, tapping the tag associated with the folio device may result in initiating a short range communication with the tag associated with the folio device at an instance in which the mobile device is sufficiently proximate the tag associated with the folio device to communicate.

Another example method for transferring check information from a mobile device to a folio device may comprise performing an action with the mobile device proximate the folio device; receiving in response a folio device identifier associated with the folio device; and providing for transmission of the check information to the folio device based at least in part on the folio device identifier.

In an example embodiment, the action may comprise tapping a tag associated with the folio device.

In another example embodiment, the action may comprise scanning a tag associated with the folio device.

In yet another example embodiment, tapping the tag may result in initiating a short range communication with the tag at an instance in which the mobile device is sufficiently proximate the tag to communicate.

Another example method for identifying a check to be closed with a mobile device may comprise tapping a tag associated with a physical location associated with the check to obtain an indication of the check.

Another example method for transferring check information to a folio device may comprise tapping a tag associated with a folio device to initiate transfer of the check information to the folio device.

An example apparatus for identifying a check to be closed may comprise at least one processor; and at least one memory comprising computer program code, the at least one memory and the computer program code configured to, with the at least one processor, cause the apparatus at least to: perform an action with the mobile device proximate a physical location associated with the check; receive in response a location identifier associated with the physical location; and determine the check to be closed based at least in part on the location identifier.

Another example apparatus for transferring check information to a folio device may comprise at least one processor; and at least one memory comprising computer program code, the at least one memory and the computer program code configured to, with the at least one processor, cause the apparatus at least to: perform an action with the mobile device proximate the folio device; receive in response a folio device identifier associated with the folio device; and provide for transmission of the check information to the folio device based at least in part on the folio device identifier.

BRIEF DESCRIPTION OF THE DRAWINGS

Figure 1:
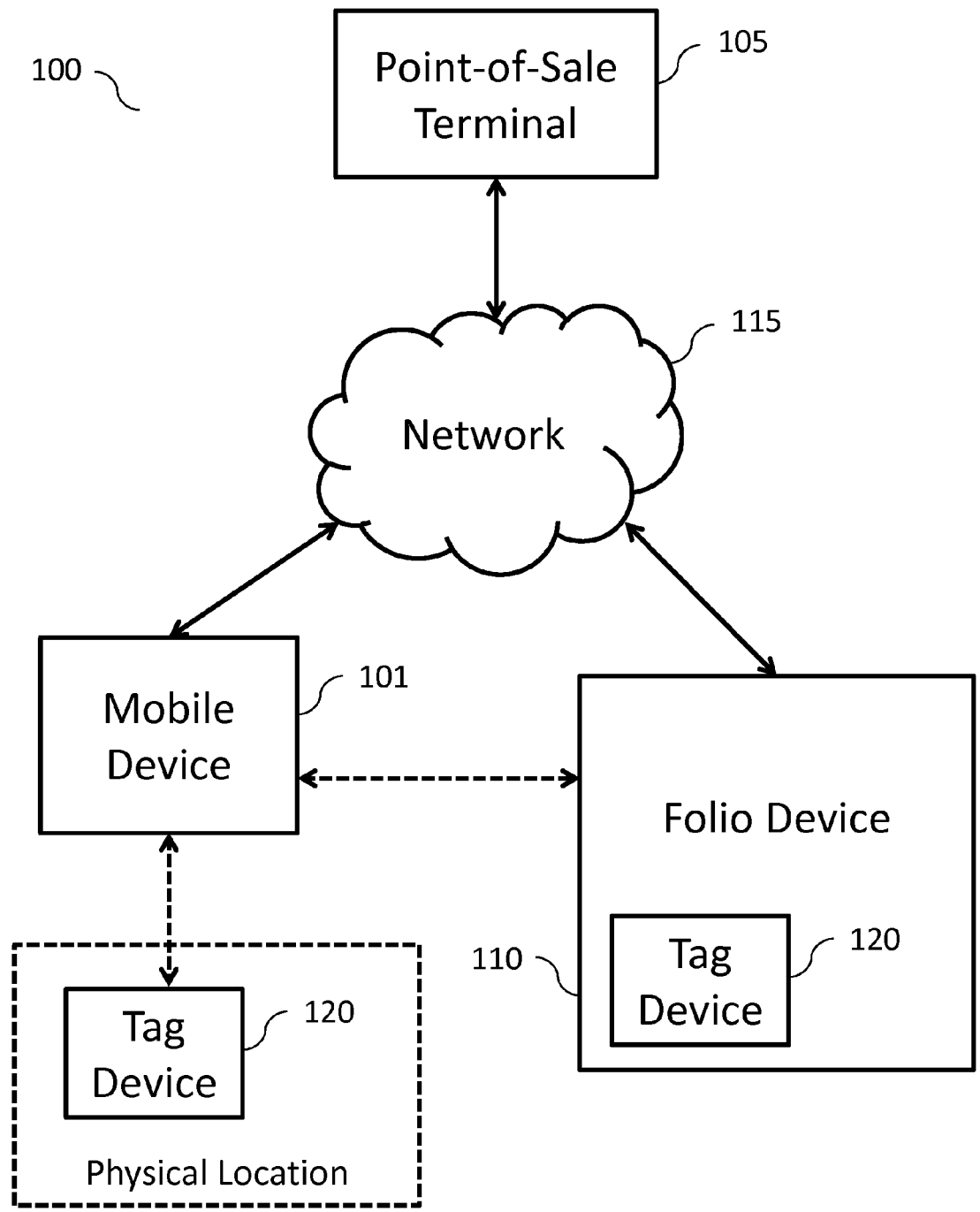

Having thus described the invention in general terms, reference will now be made to the accompanying drawings, which are not necessarily drawn to scale, and wherein:

FIG. 1 provides an illustration of one embodiment of an architecture that can be used to practice various aspects of the present invention.

Figure 2:
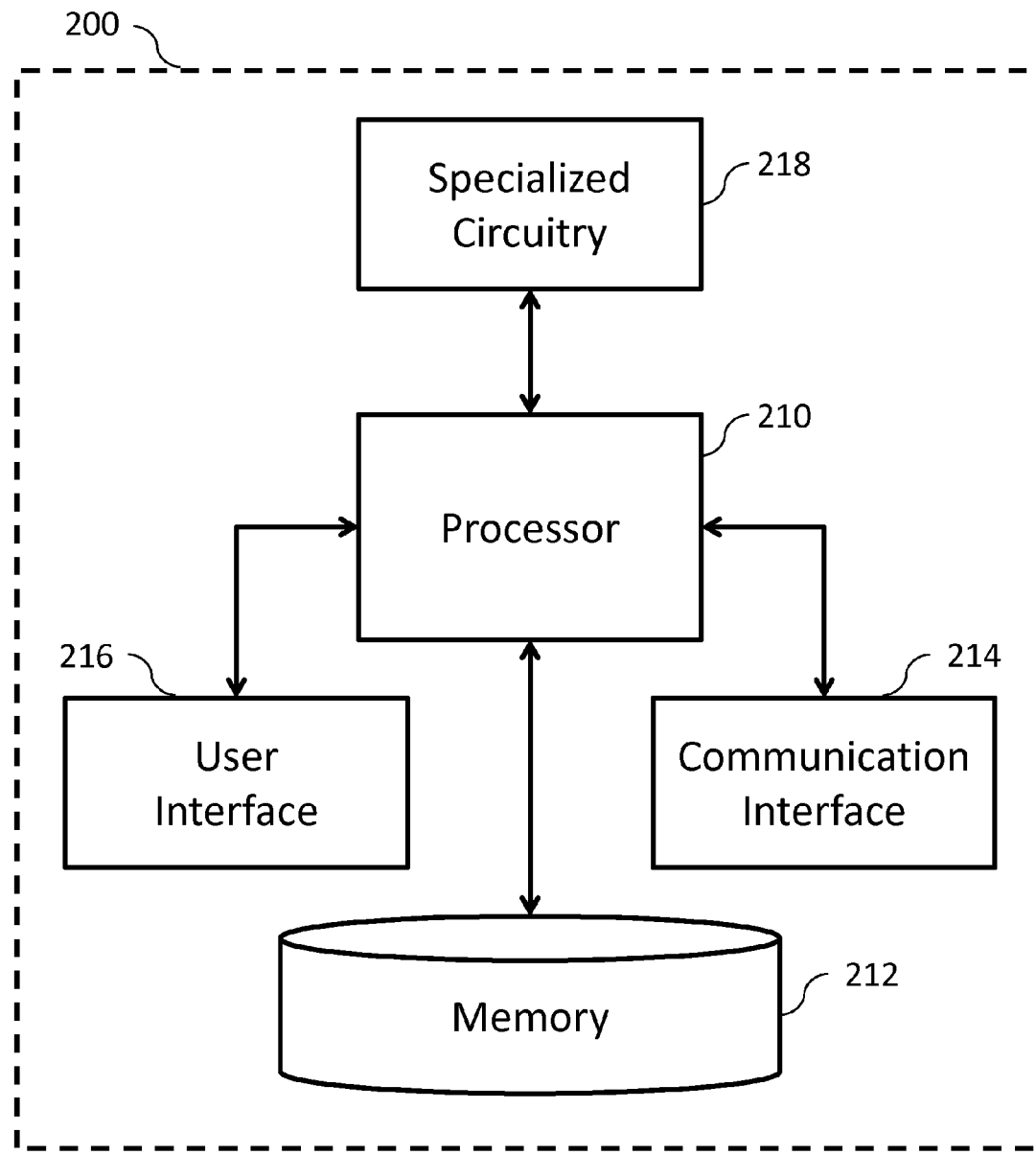

FIG. 2 provides a schematic diagram of a generic apparatus according to an embodiment of the present invention.

Figure 3:
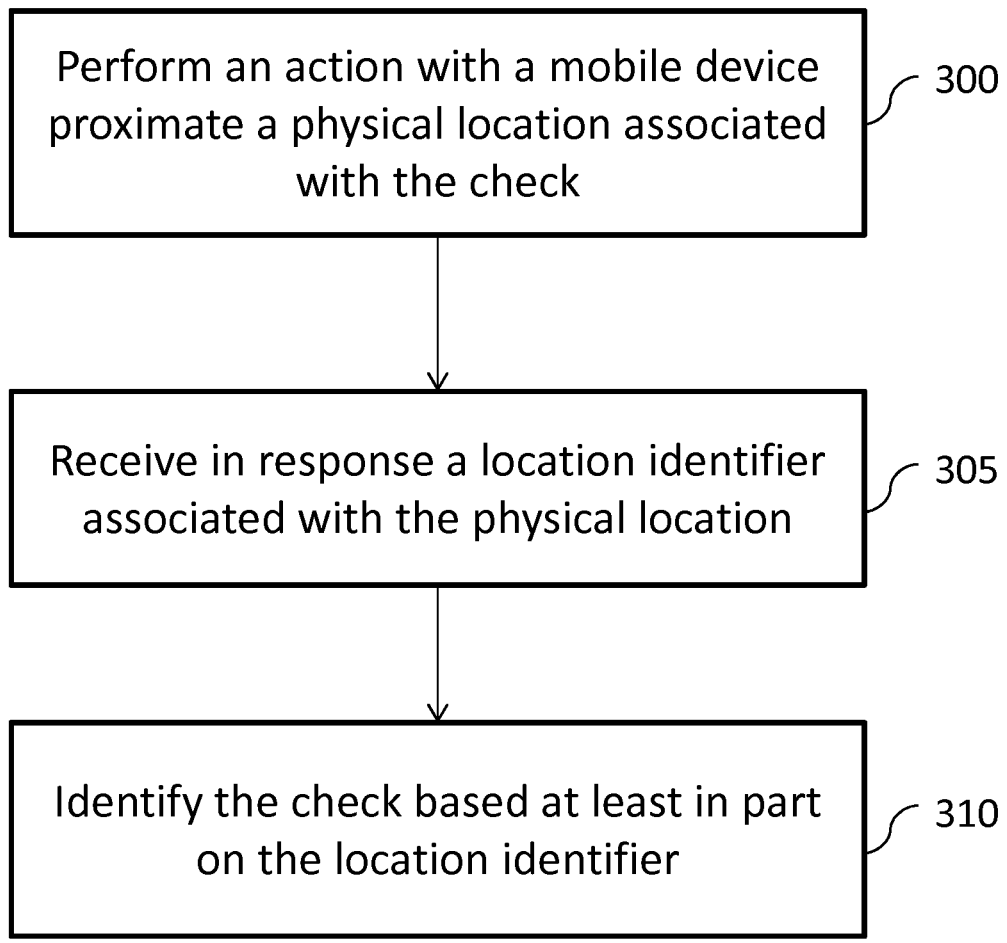

FIG. 3 provides a flowchart for facilitating closing and payment of a check from the perspective of a mobile device according to an embodiment of the present invention.

Figure 4:
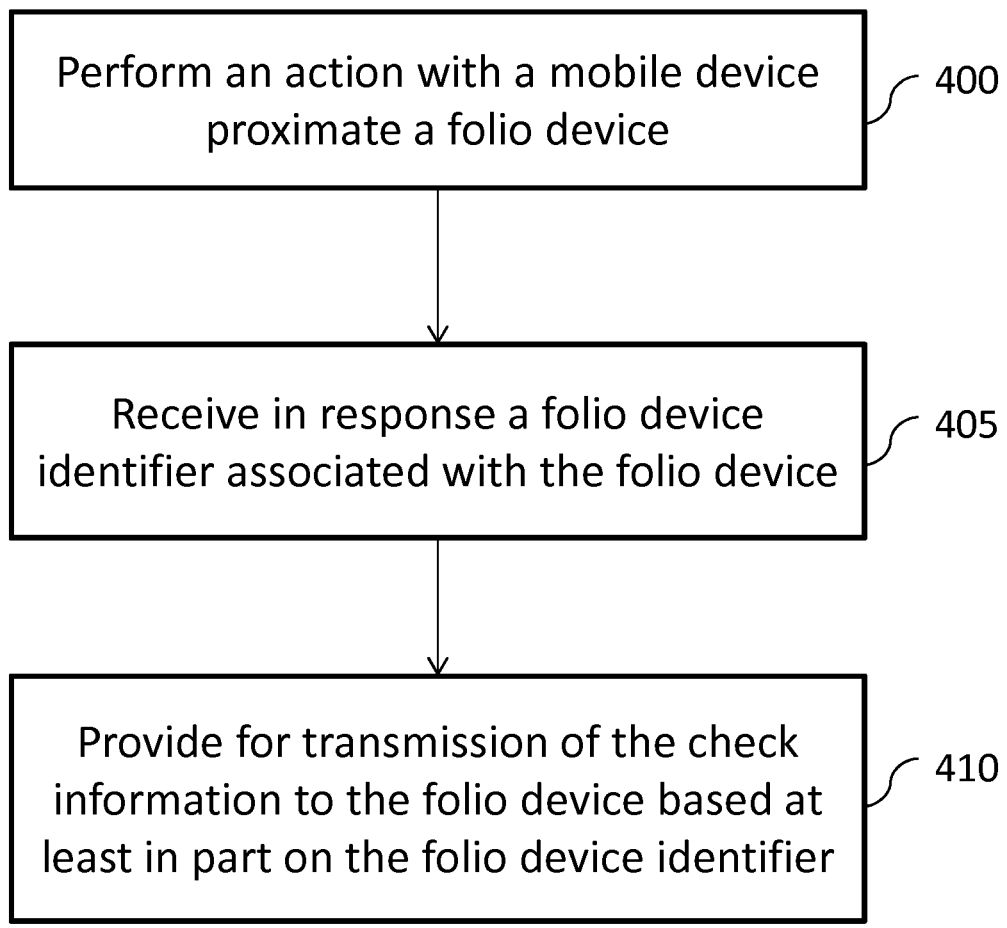

FIG. 4 provides a flowchart for facilitating closing and payment of a check from the perspective of a mobile device according to an embodiment of the present invention.

DETAILED DESCRIPTION OF THE INVENTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

FIG. 1 provides an illustration of a system 100 that can be used in conjunction with various embodiments of the present invention to facilitate closing and payment of a check. As shown in FIG. 1, the system 100 may include one or more mobile devices 101. For instance, a mobile device 101 may comprise a smartphone device, mobile telephone, mobile computer, mobile point-of-sale device, portable digital assistant (PDA), laptop computer, gaming device, electronic tablet, or any other type of similar electronic device. The system 100 may further include one or more point-of-sale terminals 105. For example, a point-of-sale terminal 105 may comprise a back-end point-of-sale terminal or the like. Additionally, the system 100 may comprise one or more folio devices 110. For instance, a folio device 110 may comprise a payment device, such as a mobile payment device (e.g., a portable payment device, smartphone, or mobile phone), a fixed-position payment device (e.g., a fixed payment kiosk or a fixed payment device at a table/location), and/or the like. The system may additionally comprise one or more tag devices 120. A tag device 120 may be associated, for example, with a folio device 110 or a physical location of a customer (e.g., a table or seat at a bar). Each entity of the system 100 may be connected, directly or indirectly, to one or more other entities of the system 100 via a network 115. The network 115 may be a wired and/or wireless network comprising one or more of a local area network, wide area network, cellular network, internet, or the like. In some embodiments, various entities of the system 100 may be connected directly to one another separate from the network 115. For example, the mobile device 101 may connect directly with a tag device 120 or a folio device 110. It should be noted that other system architectures are contemplated that may be used to practice various aspects of the invention. Thus, the system 100 provided in FIG. 1 is for illustrative purposes only and should not be construed to limit the scope of the invention. Further, while FIG. 1 illustrates certain system entities as separate, standalone entities, the various embodiments are not limited to this particular architecture.

In various embodiments, a mobile device 101, a point-of-sale terminal 105, and/or a folio device 110 may be embodied as or otherwise include an apparatus 200 as generically represented by the block diagram of FIG. 2. In the example embodiment, the apparatus 200 may comprise various means for performing the various functions herein described. These means may comprise one or more of a processor 210, memory 212, communication interface 214, user interface 216, or specialized circuitry 218. The various means may be in communication with one another, such as via a bus.

The means of the apparatus 200 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., memory 212) that is executable by a suitably configured processing device (e.g., the processor 210), or some combination thereof. In some example embodiments, the processor 210, memory 212, communication interface 214, user interface 216, and/or specialized circuitry 218 may be embodied as a chip or chip set.

The processor 210 may, for example, be embodied as various means including circuitry, one or more microprocessors with accompanying digital signal processor(s), one or more processor(s) without an accompanying digital signal processor, one or more coprocessors, one or more multi-core processors, one or more controllers, one or more computers, various other processing elements including integrated circuits such as, for example, an ASIC (application specific integrated circuit) or FPGA (field programmable gate array), one or more other hardware processors, or some combination thereof. Although illustrated in FIG. 2 as a single processor, in some embodiments the processor 210 may comprise a plurality of processors. The plurality of processors may be in operative communication with each other and may be collectively configured to perform one or more functionalities of the apparatus 200 as described herein. The plurality of processors may be embodied on a single device or distributed across a plurality of devices collectively configured to function as the apparatus 200.

In some example embodiments, the processor 210 may be configured to execute instructions stored in the memory 212 or memory otherwise accessible to the processor 210. These instructions, when executed by the processor 210, may cause the apparatus 200 to perform one or more of the functionalities of the apparatus 200 as described herein. Further, the processor 210 may comprise functionality to operate one or more software programs, which may be stored in memory. For example, the processor 210 may be capable of operating a connectivity program, such as a web browser. The connectivity program may allow the apparatus 200 to transmit and receive web content, such as location-based content, according to a protocol, such as Wireless Application Protocol (WAP), hypertext transfer protocol (HTTP), and/or the like. The apparatus 200 may be capable of using protocol(s), such as Transmission Control Protocol/Internet Protocol (TCP/IP), to transmit and receive web content across the internet or other networks.

The memory 212 may comprise, for example, volatile memory, non-volatile memory, or some combination thereof. In this regard, the memory 212 may comprise one or more tangible and/or non-transitory computer-readable storage media that may include volatile and/or non-volatile memory. Although illustrated in FIG. 2 as a single memory, the memory 212 may comprise a plurality of memories. The plurality of memories may be embodied on a single device or may be distributed across a plurality of devices collectively configured to function as the apparatus 200. In various example embodiments, the memory 212 may comprise a magnetic storage device (e.g., hard disk), dynamic and/or static random access memory (RAM), read only memory (ROM), cache memory, flash memory, optical disc, subscriber identity module (SIM), removable user identity module (R-UIM), circuitry configured to store information, or some combination thereof. The memory 212 may be configured to store information, data, applications (e.g., software programs), instructions, and/or the like, in some instances for execution by the processor 210, for enabling the apparatus 200 to carry out various functions in accordance with various example embodiments.

The communication interface 214 may be embodied as any device or means embodied in circuitry, hardware, a computer program product comprising computer readable program instructions stored on a computer readable medium (for example, the memory 212) and executed by a processing device (for example, the processor 210), or a combination thereof that is configured to receive and/or transmit data from/to another computing device. The communication interface 214 may include, for example, an antenna, a transmitter, a receiver, a transceiver, and/or supporting hardware or software for enabling communications with one or more remote devices. The communication interface 214 may be configured to receive and/or transmit data using any protocol that may be used for communications between devices.

The user interface 216 may be in communication with the processor 210 to receive an indication of a user input and/or to provide an audible, visual, mechanical, or other output to a user. As such, the user interface 216 may include, for example, a keyboard, keypad, scanner, printer, mouse, joystick, display (e.g., touch screen display), microphone, speaker, and/or other input/output mechanisms. The processor 210 and/or user interface circuitry comprising the processor 210 may be configured to control one or more functions of the user interface 216 through computer program instructions (e.g., software and/or firmware) stored on memory (e.g., memory 212) accessible to the processor 210.

The specialized circuitry 218 may be embodied as various means, such as circuitry, hardware, a computer program product comprising computer readable program instructions stored on a computer readable medium (for example, the memory 212) and executed by a processing device (for example, the processor 210), or some combination thereof and, in some embodiments, is embodied as or otherwise controlled by the processor 210.

General Overview

Various embodiments of the present invention provide solutions for improving the efficiency and reliability of common actions performed by a user, such as a hospitality service provider. Such solutions may provide for automating and/or simplifying common transactions. For example, an embodiment may provide for quickly and easily associating an object with an action to be performed. The object may be a physical object, such as a table in a restaurant or a folio device 110, and the action to be performed may be an action (e.g., a gesture) performed by a mobile device of a hospitality service provider, such as associating a check with a table for managing an order or associating a check with a folio device 110 for accepting payment for the check.

In an example embodiment, a hospitality service provider (e.g., a waiter at a restaurant) may provide products and/or services to one or more customers. The waiter may open a separate check, or bill, for each customer, or group of customers, and add the items purchased by the customer to the check. The waiter may carry a mobile device configured to store check information for each customer and/or to provide the customer check information to, or access the customer check information from, a remote device (e.g., a point of sale terminal). Each customer or group may be associated with a particular physical location, such as, for example, a table, a seat at a table, or a seat at a bar. The physical location may be associated with a location identifier, such as a unique number or code. The location identifier may be provided at the physical location, or other location, in a form that may be directly or indirectly acquired by a mobile device. A customer's check may be associated with the location identifier of the physical location of the customer to facilitate identification and retrieval of the customer's check.

According to this example embodiment, the waiter may wish to provide a customer with her check to be paid for the products and/or services rendered. The check may be provided in such a way to allow the customer to pay the check without further interaction from the waiter or any other staff. As a general overview, the waiter may first retrieve the check to be closed. The check may be one currently presented or accessible to the waiter via the mobile device. In other instances, the waiter may retrieve the check by tapping or scanning with his mobile device a tag associated with the customer's location. Doing so allows the mobile device to obtain the location identifier for that location via short range communication or scanning. The mobile device may retrieve the check using the obtained location identifier. In this example embodiment, the waiter may then use or repeat the tap or scan process with a folio device 110 to transfer the customer's check information to the folio device 110. That is, the waiter may select a folio device 110 and tap or scan it, or a tag associated with it, with his mobile device to identify the folio device 110 to the mobile device. The mobile device may then initiate the transfer of the check details to the identified folio device 110. Once the check has been transferred, the waiter may provide the folio device 110 to the customer for payment. The customer may use the folio device 110 to effect payment without further input from the waiter.

Detailed Embodiments

Turning to a more detailed description of a process for facilitating closing and payment of a check by a user at a business according to various embodiments of the present invention. In example embodiments, a user may open and add items to a check for a customer or group of customers located at a particular area in a business. When there are no further items to add to the check, the user may close the check and transfer the check to a folio device 110. The folio device 110 may be provided to the customer to allow for payment of the check without further assistance from the user. The user may be a waiter, sales representative, employee of the business, and/or the like; and a business may be a restaurant, bar, store, movie theater, shop, and/or the like. For simplicity, the embodiments below are described with respect to a waiter and a restaurant. It should be understood, however, that various embodiments contemplate users and businesses other than waiters and restaurants.

The waiter may perform various actions related to the check using a mobile device 101. The mobile device 101 may be the waiter's personal device (e.g., smartphone) or a device (e.g., a handheld device) provided temporarily to the waiter by the restaurant. The mobile device 101 may be configured to connect to a network (e.g., network 115) to facilitate the check closing and payment process. The network may be, for example, a network for which access is provided by the restaurant. In this regard, the network may be a local network (e.g., a Wi-Fi network) with or without access to an external network (e.g., the internet). Communication between the mobile device 101 and a point-of-sale terminal 105 may occur via the network. In this regard, the mobile device 101 and the point-of-sale terminal 105 may share information back and forth, for example, about one or more checks associated with one or more customers. In an example embodiment, the mobile device 101 may send messages to the point-of-sale terminal 105 requesting to open or indicating the opening of a check, identifying the physical location (e.g., table) associated with the check, providing indications of the items selected for purchase by the customer, requesting to close or indicating the closing of a check, and requesting to transfer or indicating the transfer of a check, as further described below.

According to example embodiments, the mobile device 101 may be configured to open a check, or check, for a customer or group of customers at the restaurant. The mobile device 101 may provide for display of a user interface to the waiter comprising an option to open, or create, a new check for a customer. In some instances, opening the check may comprise the mobile device 101 communicating with the point-of-sale terminal 105 to open the check on the point-of-sale terminal 105. In other embodiments, the check may have been previously opened by the point-of-sale terminal 105 and the mobile device 101 may open the existing check locally. The mobile device 101 and/or point-of-sale terminal 105 may be configured to store the opened check, for example, in memory. Additional information associated with the check, such as a location identifier for the physical location of the customer, may be stored in association (e.g., linked) with the check. For example, each table, seat, and/or bar seat at the restaurant may be associated with a unique location identifier (e.g., a code, text or alphanumeric string, or number). The location identifier may, for example, comprise an indication of the table or seat number. In some embodiments, the additional information may comprise other identifying information associated with the customer. For example, the additional information may comprise a customer name, description, photo, and/or the like. The mobile device 101 may store the location identifier and other additional information in association with the check to assist the waiter, mobile device 101, and point-of-sale terminal 105 with correlating the correct check with the correct customer.

Once the check has been opened, the mobile device 101 may be configured to add items for purchase to the check. In this regard, the mobile device 101 may receive input from the waiter regarding items the customer requests to purchase or has already purchased. For example, the waiter may take the customer's food order and add the requested food items to the check via the mobile device 101 (e.g., via a user interface). The mobile device 101, in certain embodiments, may be configured to provide an indication of the items to the point-of-sale terminal 105.

The mobile device 101 may be configured, in example embodiments, to add additional details to the check. The mobile device 101 may be configured to store an indication of the waiter or waiters providing service for the check, such as the name of the waiter. Payment details, such as customer loyalty information, coupon or discount information, and/or designations of items on the check to a particular guest (e.g., to enable check-splitting) may be added to the check by the mobile device 101. In some instances, the check may include instructions or orders to additional staff (e.g., kitchen staff) related to the items on the check.

According to example embodiments, the mobile device 101 may be configured to receive an indication to close a check. In this regard, the mobile device 101 may receive input from the waiter indicating that a check is ready to be paid. For example, the mobile device 101 may be configured to present a user interface to the waiter comprising an option to close a check. The mobile device 101 may then receive a selection from the waiter via the user interface to close the check.

The mobile device 101 may receive an indication of the check to be closed. In certain embodiments, the mobile device 101 may receive a selection by a waiter of a check stored on the mobile device 101 or point-of-sale terminal 105. For example, the mobile device 101 may present a plurality of checks from which the desired check may be selected by the waiter. In other embodiments, the input received from the waiter may indicate that the check to be closed is the check currently displayed by the mobile device 101. In yet other embodiments, the mobile device 101 may receive or obtain an indication of the location identifier associated with the check, as further described below.

According to various embodiments, the mobile device 101 may receive or obtain an indication of the location identifier associated with the check to be closed based at least in part on an action performed by the mobile device 101. The mobile device 101 may perform the action in relation to a location identifier indicator. The location identifier indicator may be, in some instances, a tag (e.g., a tag device 120) associated with the physical location associated with the check to be closed. In this regard, the tag may be located at or nearby the physical location (e.g., table), for example attached to or embedded in the physical location or to an object proximate the physical location.

In some instances, the location identifier indicator, or tag, may be configured to provide for short range communication. For example, the tag may be configured to communicate according to a certain wireless standard or technology, such as Radio-frequency identification (RFID), Bluetooth®, Bluetooth® Low Energy (BLE), Near Field Communication (NFC), peer-to-peer Wi-Fi, other radio frequency transmissions, and/or the like. In these instances, the mobile device 101 may perform a tap action to obtain the location identifier. For example, the waiter may tap the tag with the mobile device 101. Tapping the tag may comprise bringing the mobile device 101 in contact with the tag or bringing the mobile device 101 proximate the tag. The tapping action may be performed relatively quickly, as in a typical tapping action, or in some cases may involve maintaining the mobile device 101 proximate the tag for a longer period of time. When close to or in contact with the tag, the mobile device 101 may be configured to communicate with the tag via short range communication. In this regard, the mobile device 101 may be configured to receive an indication of a location identifier from the tag. The mobile device 101 may automatically communicate with a tag whenever a tag is tapped. In other embodiments, the mobile device 101 may receive input from the waiter prior to the tapping action to temporarily enable the short range communication.

In other instances, the location identifier indicator, or tag, may comprise a scannable code. For example, the tag may comprise a static or dynamic one-dimensional or two-dimensional bar code (e.g., a Quick Response (QR) code). In these instances, the mobile device 101 may perform a scan action to obtain the location identifier. In this regard, the mobile device 101 may be configured to scan the bar code displayed by the tag. The bar code associated with the tag may encode an indication of the location identifier. The mobile device 101 may scan the tag using a built-in or separate bar code scanner, an imager, a camera, and/or the like. In this way, the mobile device 101 may obtain the location identifier from the bar code associated with the tag.

In yet other instances, the location identifier indicator, or tag, may comprise a human readable code. For example, the tag may display the location identifier as a text, numeric, or alphanumeric string. In these instances, the mobile device 101 may be configured to receive input from the waiter comprising the location indicator. In this regard, the waiter may read the location indicator from the tag and manually input the location identifier into the mobile device 101.

According to various embodiments, the mobile device 101 may retrieve the check to be closed, including the associated check information (e.g., items ordered, cost, tax). The retrieval of the check may be based at least in part on the selection and/or indication received identifying the check. For example, a unique check identifier (e.g., a check number, text or alphanumeric string, or code), or location identifier associated with the check, contained in the indication and/or selection may be used by the mobile device 101 to retrieve the check. In some instances, the check information may be retrieved from the mobile device 101 (e.g., from the memory of the mobile device 101). In other instances, the check information may be retrieved by the mobile device 101 from the point-of-sale terminal 105 (e.g., from the memory of the point-of-sale terminal 105). In instances in which the waiter selects the currently displayed check, the mobile device 101 may already possess or may have already retrieved the check information. The mobile device 101 may be configured to provide feedback to the waiter related to the success or failure to retrieve the check. The feedback may be visual, audible, haptic, or otherwise. For example, the mobile device 101 may be configured to produce light (e.g., a light emitting diode (LED)) having one or more pulses, colors, intensities, and/or durations; sound having one or more frequencies, volumes, and/or durations; vibrations having one or more frequencies, amplitudes, and durations; and/or any other output such as a prompt (e.g., a software pop-up) or indication on a display of the mobile device 101.

In example embodiments, the waiter may select a folio device 110, which may be used to provide the check information to the customer and to receive payment. The mobile device 101 may communicate with the folio device 110 to establish that the folio device 110 will be used to handle payment of the check. In some instances, the mobile device 101 may receive from the selected folio device 110 an indication of a folio device identifier associated with the folio device 110. The folio device identifier may be, for example, a unique text, numeric, or alphanumeric string or code assigned to the folio device 110. In certain embodiments, the physical location of the folio device 110 need not be known, nor does the folio device 110 need be pre-configured by the mobile device 101 or a point-of-sale terminal 105 prior to communication with the mobile device 101. In yet other embodiments, the folio device 110 need not be aware of the communication with the mobile device 101. For example, the folio device 110 may be a third party device unaware of a physical tag associated with it by the restaurant. That is, the mobile device 101 may communicate with the tag associated with the folio device 110 to identify the folio device 110 rather than communicating with the folio device 110 itself. In this example, the folio device 110 may only communicate with the point-of-sale terminal 105.

The mobile device 101 may use the folio device identifier to facilitate transfer of the check information to the folio device 110. For example, the mobile device 101 may use the folio device identifier to identify and communicate with the folio device 110 over a network connection (e.g., a wireless connection), which may be between the mobile device 101 and the folio device 110 via one or more intervening entities of the network 115 (e.g., the point-of-sale terminal 105). In this example, the mobile device 101 may transmit the folio device identifier to the point-of-sale terminal 105, which may use the identifier to locate the folio device 110, and the point-of-sale terminal 105 may transmit the check information to the folio device 110. In other instances, the mobile device 101 may establish a direct connection with the folio device 110. The mobile device 101 may then transmit the check information directly to the folio device 110 via the connection. In some instances, the check may not be further modified once the check has been finalized and transferred to the folio device 110.

According to certain embodiments, the mobile device 101 may perform an action to enable transfer of the check information to the folio device 110. In this regard, the mobile device 101 may perform an action to enable receiving the folio device identifier or to enable the direct connection with the folio device 110. The action performed by the mobile device 101 may be similar to the tap action or scan action described above with respect to obtaining the location identifier. In some instances, the tap action or scan action may be used to receive the folio device identifier from a folio device identifier indicator, such as a tag, associated with the folio device 110. For example, the mobile device 101 may be configured to scan a bar code associated or displayed by the folio device 110. In other instances, the tap action or scan action may be used to initiate communication between the mobile device 101 and the folio device 110 such that a direct connection (e.g., a Bluetooth®, BLE, RFID, peer-to-peer Wi-Fi, or NFC connection) between the two may be established and used to transmit the check information. For example, the mobile device 101 may discover, pair, or automatically establish a connection with the folio device 110 when the two devices are brought within range of each other. In yet other instances, the mobile device 101 may receive the folio device identifier via manual input from the waiter. For example, the waiter may read the folio device identifier from the folio device 110 and input the information into the mobile device 101 (e.g., via a user interface).

In other embodiments, the folio device 110 may be configured to perform one or more of the actions in relation to the location identifier indicator and the mobile device 101. For example, the folio device 110 may be configured to tap the tag, scan the bar code, or receive input of the human readable code associated with the location identifier indicator to retrieve the check. In another example, the mobile device 101 may first retrieve the check as in the above embodiments. In this example, the mobile device 101 may comprise or display a tag, bar code, or human readable code. The folio device 110 may be configured to tap the tag, scan the bar code, or receive input of the human readable code to initiate transfer of the check from the mobile device 101 to the folio device 110.

According to example embodiments, the folio device 110 may be provided to the customer for effecting payment of the check. The folio device 110 may permit one or more customers to pay the check in whole, in part, or in parts. In certain instances, no further interaction may be required from the waiter or mobile device 101 to complete the payment transaction. In this regard, the folio device 110 may be configured to receive payment for the check. For example, the folio device 110 may be equipped with a credit/debit card reader and/or may be configured to receive payment electronically, such as via a mobile wallet or online payment account. In this example, the folio device 110 may be configured to receive payment in the form of a bank or debit card, credit card, loyalty card, stored value or gift card, and/or the like. In some instances, the folio device 110 may require further information for security purposes, such as a personal identification number (PIN), postal code (e.g., zip code), card verification value (CVV), one-time use code (e.g., received via text message), and/or the like.

In example embodiments, the folio device 110 may receive payment via an account token (e.g., a fob, keychain tag, or similar personal article carried by the guest) or a device (e.g., a mobile phone, wearable computer, or other computing device carried by the guest) containing personally identifiable payment information, such as on a magnetic stripe, stored in memory accessible by a processor, or printed or embossed in alphanumeric or bar code form. The folio device 110 may obtain the payment information from the token or device via one or more of a magnetic stripe reader, barcode scanner, imaging scanner, camera, processor interface (e.g., based on electrical contacts), NFC, RFID, BLE, peer-to-peer, Wi-Fi, or other radio interface techniques. The token or device may be presented by one or more customers associated with the check.

According to example embodiments, one or more payment sessions may be opened between the folio device 110 and the mobile device 101 and/or point-of-sale terminal 105 by the folio device 110, mobile device 101, or point-of-sale terminal 105. In this regard, the folio device 110 may be permitted to apply payments to the check. In some instances, the customer's payment information may be sent by the folio device 110 directly to a payment service without ever being sent to the waiter's mobile device 101 or a point-of-sale terminal 105. For example, the folio device 110 may be the customer's personal mobile device (e.g., a smartphone or mobile phone) and may be configured to accept payment via a mobile wallet. In other instances, the customer's payment information may be sent by the folio device 110 to a point-of-sale terminal 105 (e.g., a back end point-of-sale device) without ever being sent to the waiter's mobile device 101.

The folio device 110 may further be configured to accept gratuity from the customer for the customer service. In some instances, the folio device 110 may facilitate the redemption of loyalty program awards and/or the accrual of loyalty program points. The folio device 110 may print or email to the customer a receipt reflecting the details of the transaction. Once the folio device 110 receives payment from the customer, the customer has finished the transaction and may leave without further interaction with the waiter. In certain embodiments, the payment transaction may require further interaction with the waiter. For example, the customer may pay with cash and require change from the waiter that the folio device 110 may not be configured to provide. In other embodiments, the folio device 110 may only be used for credit/debit/electronic payment. The payment, gratuity, loyalty program information, and/or the like may be posted by the folio device 110 or the mobile device 101 to the point-of-sale terminal 105.

According to example embodiments, the folio device 110 may provide an indication to the customer and/or waiter that a payment has been made. The indication may be associated with the full payment of the check or the payment of a portion of a check (e.g., a customer paying his or her portion of the check). The indication may comprise producing light (e.g., via an LED) having one or more pulses, colors, intensities, and/or durations; sound having one or more frequencies, volumes, and/or durations; vibrations having one or more frequencies, amplitudes, and durations; and/or any other output such as a prompt (e.g., a software pop-up) or indication on the mobile device 101 and/or the folio device 110.

In example embodiments, the mobile device 101 may be configured to clear the closed check. For example, after the mobile device 101 transfers the check information to the folio device 110, the mobile device 101 may be configured to delete the check from the mobile device 101, point-of-sale terminal 105, and/or the entire system. In some instances, the entire record of the check may be deleted. In other instances, the check may be cleared of all transaction information and reused. The same check may be reused for the same physical location or, in certain instances, the association between the check and the physical location may be removed so that the check may be reused with a new physical location.

FIG. 3 provides a flowchart according to an example method for facilitating closing and payment of a check. The operations performed by a method, apparatus, and computer program product of this example embodiment are illustrated from the perspective of an apparatus 200 embodied as a mobile device 101. The apparatus 200 embodied by the mobile device 101 may comprise means, such as the specialization circuitry 218, the processor 210, or the like. In this example embodiment, the various operations may be performed by the specialized circuitry 218 embodied as check closing circuitry. The method, apparatus, and computer program product for identifying a check with a mobile device may comprise performing an action with the mobile device proximate a physical location associated with the check at operation 300. At operation 305, the method, apparatus, and computer program product may comprise receiving in response a location identifier associated with the physical location. The method, apparatus, and computer program product may comprise identifying the check based at least in part on the location identifier at operation 310.

FIG. 4 provides a flowchart according to an example method for facilitating closing and payment of a check. The operations performed by a method, apparatus, and computer program product of this example embodiment are illustrated from the perspective of an apparatus 200 embodied as a mobile device 101. The apparatus 200 embodied by the mobile device 101 may comprise means, such as the specialization circuitry 218, the processor 210, or the like. In this example embodiment, the various operations may be performed by the specialized circuitry 218 embodied as check transferring circuitry. The method, apparatus, and computer program product for transferring check information from a mobile device to a folio device may comprise performing an action with the mobile device proximate the folio device at operation 400. At operation 405, the method, apparatus, and computer program product may comprise receiving in response a folio device identifier associated with the folio device. The method, apparatus, and computer program product may comprise providing for transmission of the check information to the folio device based at least in part on the folio device identifier at operation 410.

FIGS. 3 and 4 illustrate a flowchart of a system, method, and computer program product according to example embodiments of the invention. It will be understood that each block of the flowchart, and combinations of blocks in the flowchart, may be implemented by various means, such as hardware and/or a computer program product comprising one or more computer-readable mediums having one or more computer program code instructions, program instructions, or executable computer-readable program code instructions stored therein. For example, one or more of the procedures described herein may be embodied by computer program instructions of a computer program product. In this regard, the computer program product(s) that embodies the procedures described herein may be stored by one or more memory devices (e.g., memory 212) of an apparatus, server, or other computing device (e.g., apparatus 200) and executed by a processor (e.g., processor 210) in the computing device. In some embodiments, the computer program instructions comprising the computer program product(s) that embodies the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s).

Execution of instructions associated with the operations of the flowchart by a processor, or storage of instructions associated with the blocks or operations of the flowchart in a computer-readable storage medium, supports combinations of operations for performing the specified functions. It will also be understood that one or more operations of the flowchart, and combinations of blocks or operations in the flowchart, may be implemented by special purpose hardware-based computer systems and/or processors which perform the specified functions, or combinations of special purpose hardware and program code instructions.

Numerous benefits may be realized from the implementation of embodiments of the present invention. In various advantageous embodiments, a waiter may be able to quickly identify a check to be closed using a tap or scan action with a mobile device. In other advantageous embodiments, the mobile device may quickly transfer information about the check to be closed to any available folio device. In this regard, the waiter may be able to avoid using a shared work station or point-of-sale terminal to perform the above actions. Some advantageous embodiments permit a waiter to provide a folio device containing the check information to a customer that allows the customer to complete payment via the folio device with no further input required from the waiter. In an advantageous embodiment, a waiter may use their mobile device to tap a tag associated with a customer's table to identify the check to be closed; tap a folio device with the mobile device to transfer the check information to the folio device; and provide the folio device to the customer to complete payment for the transaction. Advantageous embodiments avoid cumbersome, time-consuming, and awkward manual steps that are prone to errors, such as retrieving the incorrect check. Certain advantageous embodiments increase efficiency by separating the devices used by waiters to take orders from the devices used by customers to tender payment. In various advantageous embodiments, customers are able to pay for their checks using their own mobile devices in a simple and efficient manner. Some advantageous embodiments provide for convenient coordination and interfacing between mobile and fixed point-of-sale devices and folio payment devices, even when the devices are from different vendors.

Various modifications may be made to the above described embodiments within the scope of the invention, for example, in other embodiments the mobile device 101 may use a tap action or a scan action to open the check at the beginning of the customer's dining transaction.

In other embodiments, a separate folio device 110 may be associated with each physical location. In this regard, when the customer is ready for their check, the waiter may use the mobile device 101 to perform a tap or scan action of a tag device 120 associated with the customer's physical location to retrieve the check information and then tap the folio device 110 located at the table to transfer the check information for accepting payment.

In yet other embodiments, the folio device identifier and the location identifier may be the same identifier. In these embodiments, the folio device 110 may be associated with the physical location. In this regard, the waiter may use the mobile device 101 to perform a tap or scan action of a tag device 120 associated with the folio device 110 to retrieve the check information, and then tap the folio device 110 again to transfer the check information to the folio device 110 for accepting payment.

In other embodiments, the mobile device 101 and folio device 110 may communicate via coded light or other visible transmissions, coded audio transmissions, other electronic signal transmissions, and/or the like.

In yet other embodiments, the folio device 110 may be provided by a different vendor than the mobile device 101. In these embodiments, a tag (e.g., an RFID tag or QR code) may be associated with or affixed to the folio device 110. The tag may comprise a tag identifier associated with the tag and a physical identifier associated with the folio device 110. In this regard, the mobile device 101 may perform an action (e.g., a tap gesture or scan) in relation to the tag to obtain the physical identifier of the folio device 110, and in some instances the tag identifier. The mobile device 101 may use the physical identifier to establish a connection with the folio device 110 to transfer the check. In other instances, the mobile device 101 may transmit the physical identifier, and in some instances the tag identifier, to the point-of-sale terminal 105 and the point-of-sale terminal 105 may establish a connection with the folio device 110 to transfer the check. In these instances, the folio device 110 may not be aware of the action performed by the mobile device 101 in relation to the tag.

In other embodiments, a fixed point-of-sale terminal 105 may perform all or a portion of the operations described above with respect to a mobile device 101. In this regard, the fixed point-of-sale terminal 105 may be used to open a check, add items to a check, transfer a check to a folio device 110, and/or the like. The fixed point-of-sale terminal 105 may operate in collaboration with one or more mobile devices 101. For example, a fixed point-of-sale terminal 105 may open a check and add items, a mobile device 101 may then retrieve the check and add additional items, and the fixed point-of-sale terminal 105 may be used to close the check and transfer the check to a portfolio device 110. In other examples, the fixed point-of-sale terminal 105 may operate in place of mobile devices 101. In this regard, the fixed point-of-sale terminal 105 may perform the operations performed by the mobile device 101 as described above, including with respect to a folio device 110.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method for identifying a check listing an item in a transaction for which payment is due comprising:
    receiving input via a user interface of a mobile device used by a provider of the item to close the check;
    performing a first action with the mobile device proximate a first tag at a physical location associated with the check and a customer;
    wirelessly receiving, by the mobile device from the first tag in response to the first action, a unique location identifier associated with the physical location;
    associating the check to be closed with the received unique location identifier;
    identifying, by the mobile device, the check from a memory for delivery to a mobile folio device used by the provider at the physical location based at least in part on the unique location identifier from the first tag;
    performing a second action with the mobile device proximate a second tag of the mobile folio device;
    wirelessly receiving, by the mobile device from the second tag in response to the second action, a folio device identifier associated with the mobile folio device; and
    transmitting, by the mobile device to the mobile folio device using check transferring circuitry, check information associated with the check for payment of the check based at least in part on the folio device identifier.

2. The method of claim 1, wherein the first action comprises tapping or scanning the first tag.

3. The method of claim 2, wherein the first tag comprises a radio interface device or a scannable bar code.

4. The method of claim 2, wherein tapping the first tag results in initiating a short range communication with the first tag at an instance in which the mobile device is sufficiently proximate the first tag to communicate.

5. The method of claim 1, wherein the second action comprises tapping or scanning the second tag of the mobile folio device.

6. The method of claim 5, wherein tapping the second tag of the mobile folio device results in initiating a short range communication with the second tag of the mobile folio device at an instance in which the mobile device is sufficiently proximate the second tag of the mobile folio device to communicate.

7. A system comprising:
    a mobile folio device of a provider; and
    a mobile device of the provider of an item to close a check including a listing of the item in a transaction for which payment is due, the mobile device including:
        a wireless communication device including check transfer circuitry,
        a user interface,
        a processor, and
        a memory that stores instructions executable by the processor to perform data processing activities comprising:
            receiving input via the user interface to close the check;
            performing a first action proximate a first tag at a physical location associated with the check and a customer;
            wirelessly receiving, via the wireless communication device from the first tag in response to the first action, a unique location identifier associated with the physical location;
            associating the check to be closed with the received unique location identifier;
            identifying the check from the memory for delivery to the mobile folio device used by the provider at the physical location based at least in part on the unique location identifier from the first tag;
            performing a second action with the mobile device proximate a second tag of the mobile folio device;
            wirelessly receiving, by the mobile device via the wireless communication device from the second tag in response to the second action, a folio device identifier associated with the mobile folio device; and
            transmitting, via the check transfer circuitry of the wireless communication device from the mobile device to the mobile folio device, check information associated with the check for payment of the check based at least in part on the folio device identifier.

8. The system of claim 7, wherein the first action comprises tapping or scanning the first tag.

9. The system of claim 8, wherein the first tag comprises a radio interface device or a scannable bar code.

10. The system of claim 8, wherein tapping the first tag results in initiating a short range communication with the first tag at an instance in which the mobile device is sufficiently proximate the first tag to communicate.

11. The system of claim 7, wherein the second action comprises tapping or scanning the second tag of the mobile folio device.

12. The system of claim 11, wherein tapping the second tag of the mobile folio device results in initiating a short range communication with the second tag of the mobile folio device at an instance in which the mobile device is sufficiently proximate the second tag of the mobile folio device to communicate.

* * * * *